United States Patent
Luo et al.

(10) Patent No.: US 10,185,418 B2
(45) Date of Patent: Jan. 22, 2019

(54) TOUCH PANEL

(71) Applicant: TPK TOUCH SOLUTIONS (XIAMEN) INC., Xiamen (CN)

(72) Inventors: Hua Luo, Xiamen (CN); Huilin Ye, Zhangzhou (CN); Jing Yu, Xiamen (CN); Tsung-Ke Chiu, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 496 days.

(21) Appl. No.: 14/615,433

(22) Filed: Feb. 6, 2015

(65) Prior Publication Data

US 2015/0234487 A1   Aug. 20, 2015

(30) Foreign Application Priority Data

Feb. 19, 2014 (CN) .......................... 2014 1 0056186

(51) Int. Cl.
*G06F 3/041* (2006.01)
*G06F 1/16* (2006.01)
*H04M 1/02* (2006.01)

(52) U.S. Cl.
CPC ............ *G06F 3/041* (2013.01); *G06F 1/1626* (2013.01); *G06F 1/1643* (2013.01); *G06F 1/1684* (2013.01); *G06F 1/1686* (2013.01); *G06F 2203/04103* (2013.01); *G06F 2203/04107* (2013.01); *H04M 1/0266* (2013.01); *H04M 2250/22* (2013.01)

(58) Field of Classification Search
CPC combination set(s) only.
See application file for complete search history.

(56) References Cited

U.S. PATENT DOCUMENTS

| | | | |
|---|---|---|---|
| 2007/0057348 A1* | 3/2007 | Tsai | B81C 1/00063 257/619 |
| 2010/0273530 A1* | 10/2010 | Jarvis | F16F 1/027 455/566 |
| 2013/0050123 A1* | 2/2013 | Lien | G06F 3/041 345/173 |

* cited by examiner

*Primary Examiner* — Anthony J Frost
(74) *Attorney, Agent, or Firm* — Cooper Legal Group, LLC

(57) ABSTRACT

A touch panel used for a touch control electronic device is disclosed. The touch panel comprises a first board. The first board has a first surface, wherein the first surface undergoes an atomizing process to have at least one semitransparent area. The at least one semitransparent area has a first semitransparent figure which is interlaced by an atomized area and a non-atomized area for changing a light shielding rate of the first semitransparent figure by adjusting the atomized area.

11 Claims, 10 Drawing Sheets

TOUCH PANEL

BACKGROUND OF THE INVENTION

This application claims priority to Chinese Application Serial Number 201410056186.2, filed on Feb. 19, 2014, which is herein incorporated by reference.

FIELD OF THE DISCLOSURE

The disclosure relates to touch panels, and particularly to a touch panel which undergoes an atomizing process to adjust a light shielding rate.

DESCRIPTION OF THE RELATED ART

With the development of technology, the touch panel has been widely used in a variety of consumer electronic devices, such as smart phones, tablet computers, cameras, e-books, MP3 players and other portable electronic products, or applied to the display screen for operation and control of a device.

In some approaches, a non-touch area of the touch panel usually includes an ambient light sensor (ALS) or infrared (IR) holes. The opening position of the corresponding non-touch area usually needs to be formed as a semitransparent area to meet demands for the light shielding rate of the environmental lamp hole or infrared hole. A conventional approach is to form a semitransparent area by depositing a layer of semitransparent printing ink in a corresponding region, wherein the semitransparent ink is generally made of a mix of non-transparent ink and transparent ink.

SUMMARY OF THE DISCLOSURE

It is a primary objective of the disclosure to provide a touch panel which can achieve the effect of adjusting a light shielding rate through an atomizing process.

To achieve the objective described above, the touch panel includes a first base board having a first surface, wherein at least one semitransparent area is formed on the first surface through an atomizing process. The at least one semitransparent area has a first semitransparent structure which is interlaced by the atomized area and the non-atomized area for changing a light shielding rate by adjusting the size of the atomized area.

DETAILED DESCRIPTION OF THE PREFERRED EMBODIMENT

Figure 1A:
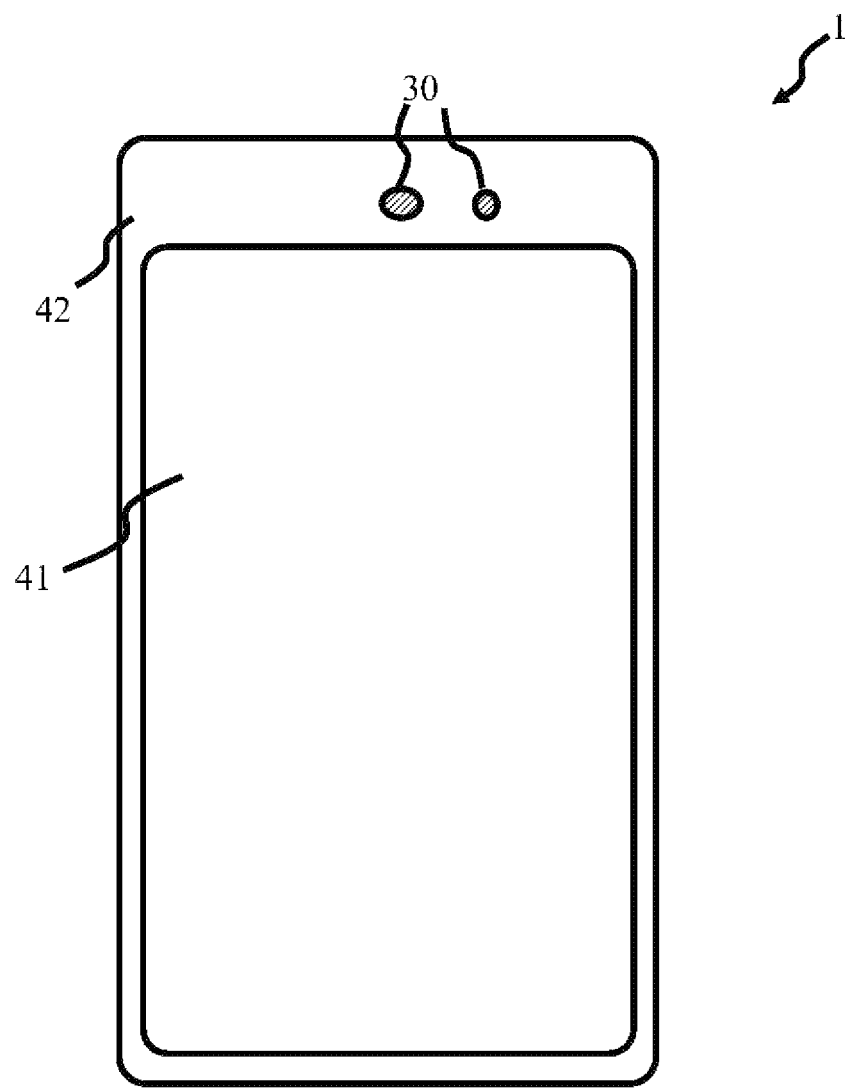
FIG. 1A is a schematic drawing showing a semitransparent area used in a touch control electronic device according to the one or more embodiments.

The orientations of "upper" and "lower" described in this specification are merely used to indicate relative positional relationships. In the drawings provided in this specification, the upper part of the touch panel is away from the user, and the lower part of the touch panel is close to the user. Also, as referred to in this specification, the terms "transparent" and "opaque" are used to indicate only the properties of the passage of light through a material. In terms of the disclosure, "transparent" is defined as meaning that a user can see an object behind the base board through the base board during normal use of the touch panel, and "opaque" is defined as meaning that a user cannot see an object behind the base board through the base board during normal use of the touch panel.

Please first refer to FIG. 1A, which is a schematic drawing of a semitransparent area used in a touch control electronic device according to one or more embodiments. Also, refer to FIG. 1B, which is a cross-sectional view of a touch panel according to one or more embodiments.

In some embodiments, a touch panel 10a is used in a touch control electronic device 1. In some embodiments, the touch control electronic device 1 is a smart phone or a tablet computer, but the disclosure is not limited thereto. In one or more embodiments of the disclosure, the touch panel 10a includes a first base board 20. The first base board 20 is made of transparent materials, which may be ethylene terephthalate (PET), polyether sulfone (PES), polyacrylate (PAR), polyethylene naphthalate (PEN), poly phenylene sulfide (PPS), polyallylate, polycarbonate (PC), glass or the like. The first base board 20 may be a rigid substrate or a flexible-type substrate, and may be in a planar, curved, or other irregular shape.

In some embodiments, the first base board 20 includes a first surface 21 and a second surface 22. In a preferred embodiment of the disclosure, the first surface 21 may be an upper surface of the first base board 20, and the second surface 22 may be a lower surface of the first base board 20, which are parallel to each other. In the first embodiment, the first surface 21 of the first base board 20 first undergoes an atomizing process to form at least one semitransparent area 30. The method of the atomizing process may include laser treatment, acid etching treatment, sand blasting or surface grinding treatment, but the disclosure is not limited thereto. Through the atomizing process, the semitransparent area 30 has a first semitransparent structure 31 which includes the atomized area 311 formed by the atomizing process interlaced with the non-atomized area 312 that did not undergo the atomizing process. After the first surface 21 of the first base board 20 undergoes the atomizing process, the corresponding semitransparent area 30 has light diffusion phenomena due to unevenness of the glass surface, ultimately resulting in a cloudy or hazy opaque appearance. If a larger area is occupied by the atomized area 311, less light inside the semitransparent area 30 can pass through the atomized area 311. Accordingly, the light shielding rate of the first semitransparent structure 31 is changed through the touch panel 10a by adjusting the size of the atomized area 311, such that the light shielding rate of the semitransparent area 30 is adjusted.

In a preferred embodiment, the atomizing process uses a blast treatment, the method of which is as follows:
1. Using a sandblasting machine, which may be a pressure feed sandblasting (shot) mechanism;
2. Using the high-speed flow of air inside the blasting machine to produce high pressure, and emitting sand materials (water mixed with emery) inside the high pressure tank of the blasting machine through a transport sand tube, and the sand materials are then jetted out to the first surface 21 of the first base board 20 at high speed with the compressed air from the spray gun nozzle; and
3. According to the predetermined blasting structure, the surface of the semitransparent area 30 on the first surface 21 is constantly impacted and damaged by sand grains to form a rough surface, and finally the processing of the atomized area 311 is completed.

Figure 1B:
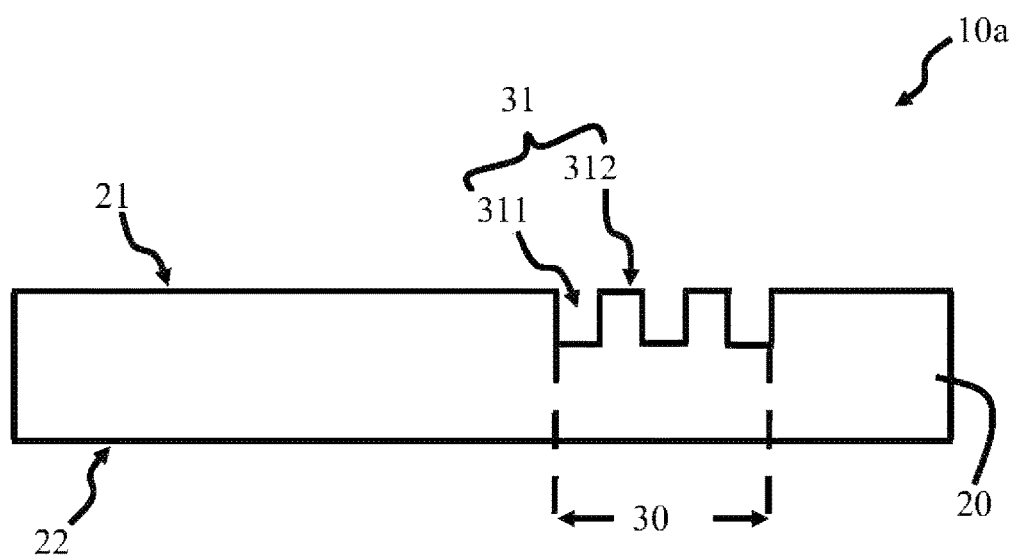
FIG. 1B is a cross-sectional view of a touch panel according to one or more embodiments.

In some embodiments, after the first surface 21 undergoes the atomizing process, the corresponding atomized area 311 is presented in the form of a plurality of recesses. As shown in FIG. 1B, a cross-sectional view of the first base board 20, the atomized area 311 and the non-atomized area 312 are interlaced with each other in a vertical direction of the first surface 21 of the first base board 20 to form a wavy structure. Specifically, the size of the recesses in the direction parallel to the first surface 21 of the first base board 20 is mainly used to control the size of the atomized area 311. In the case of an equal number of recesses, if the area is larger, the size of the atomized area 311 is larger and the light shielding rate of the semitransparent area 30 is higher. In a preferred embodiment, the opaque recessed area may be 10 to 100 nm square, but the disclosure is not limited to that specification. The area can be adjusted according to the accuracy of the atomizing process and the demand on the light shielding rate of the semitransparent area. It is worth noting that the height of the recess in a direction perpendicular to the first surface 21 of the first base board 20 is caused by the atomizing process (e.g., laser processing) and has no effect on the light shielding rate of the atomized area. In contrast, if the recess height is too great, in some cases it may cause damage to the intensity of the first base board 20. Therefore, in the actual production process, height control can be achieved through controlling the atomizing process approach (e.g., the amount of laser energy and laser). In a preferred embodiment, the height of the opaque recess may be 10 nm or less, but the disclosure is not limited to that specification.

As shown in FIG. 1A, in one or more embodiments, the touch control electronic device 1 has two semitransparent areas 30, but the disclosure is not limited thereto. The number of the semitransparent areas 30 is determined by the number of function holes, such as the ambient light sensor (ALS) and infrared (IR) holes. The light shielding rate of each semitransparent area 30 does not have to be the same. The light shielding rate of each semitransparent area 30 can be adjusted according to different light shielding rates of the function holes; i.e., the size of the atomized area 311 within each semitransparent area 30.

Figure 2A:
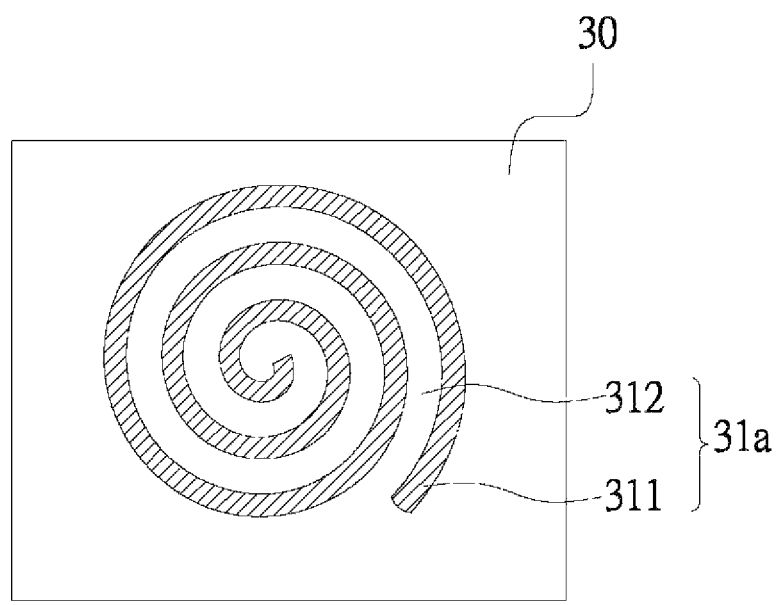
FIG. 2A is a schematic drawing showing a semitransparent structure of a touch panel according to one or more embodiments.

Through the arrangement of the aforementioned atomized area 311 and the non-atomized area 312, various embodiments of the first semitransparent structure 31 are contemplated herein, an example thereof being shown in FIG. 2A. Please refer to FIG. 2A, which is a schematic drawing showing a semitransparent structure of a touch panel according, to at least one embodiment.

In some embodiments of the semitransparent structure, the atomized area 311 and the non-atomized area 312 are interlaced with each other on the first surface 21 of the first base board 20 to form a semitransparent structure 31a in a spiral, wherein the atomized area 311 is a successive non-transparent structure and the non-atomized area 312 is a successive transparent structure.

Figure 2B:
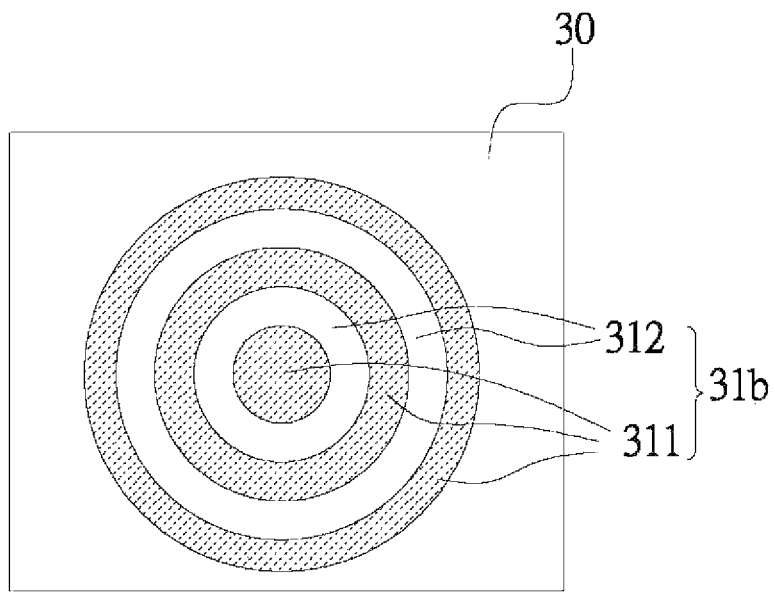
FIG. 2B is a schematic drawing showing a semitransparent structure of a touch panel according to one or more embodiments.

Now please refer to FIG. 2B, which is a schematic drawing showing a semitransparent structure of a touch panel according to one or more embodiments.

In some embodiments, the atomized area 311 and the non-atomized area 312 are interlaced with each other on the first surface 21 of the first base board 20 to form a semitransparent structure 31b in a plurality of concentric circles, wherein the atomized area 311 is a non-successive non-transparent structure and the non-atomized area 312 is a non-successive transparent structure.

Figure 2C:
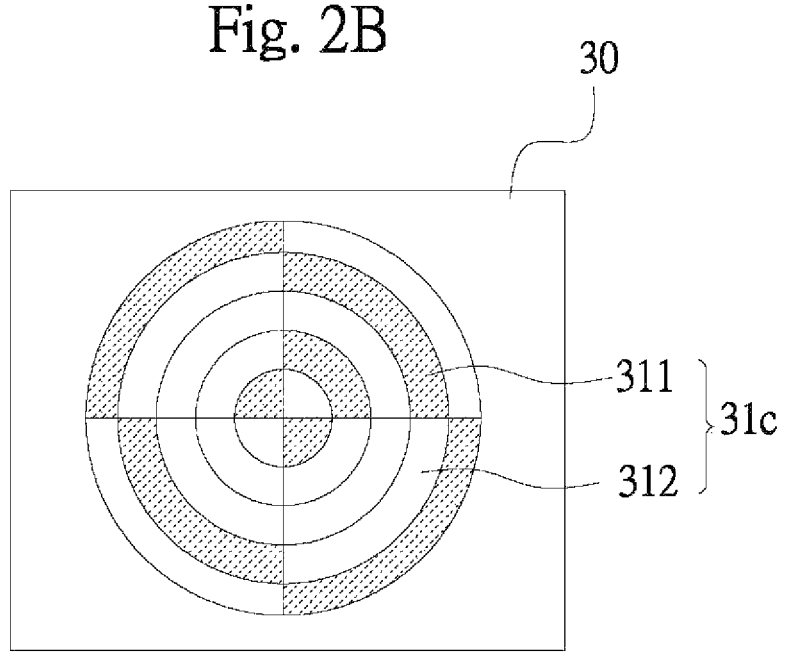
FIG. 2C is a schematic drawing showing a semitransparent structure of a touch panel according to one or more embodiments.

Now please refer to FIG. 2C, which is a schematic drawing showing a semitransparent structure of a third embodiment of a touch panel according to the present invention.

In the third embodiment of the semitransparent structure, the semitransparent structure 31c is also a structure of multiple concentric circles, but each concentric circle is made of the non-transparent structure of partially atomized area 311 and the transparent structure of partially non-atomized area 312.

Figure 2D:
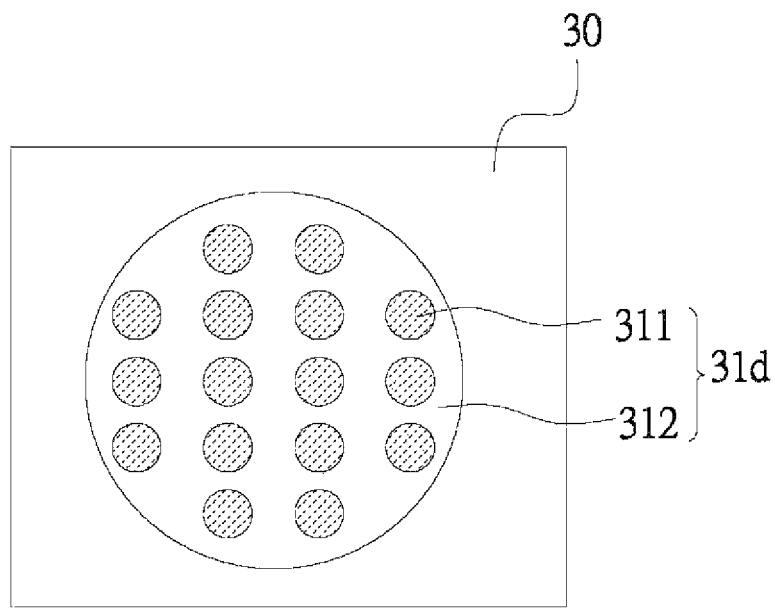
FIG. 2D is a schematic drawing showing a semitransparent structure of a touch panel according to one or more embodiments.

Now please refer to FIG. 2D, which is a schematic drawing showing a semitransparent structure of a fourth embodiment of a touch panel according to the present invention.

In the fourth embodiment of the semitransparent structure, the semitransparent structure 31d may have the dotted atomized area 311, and the atomized area 311 is surrounded by the non-atomized area 312. In this way, the light shielding rate can be adjusted according to the size and density distribution of the atomized area 311.

Figure 2E:
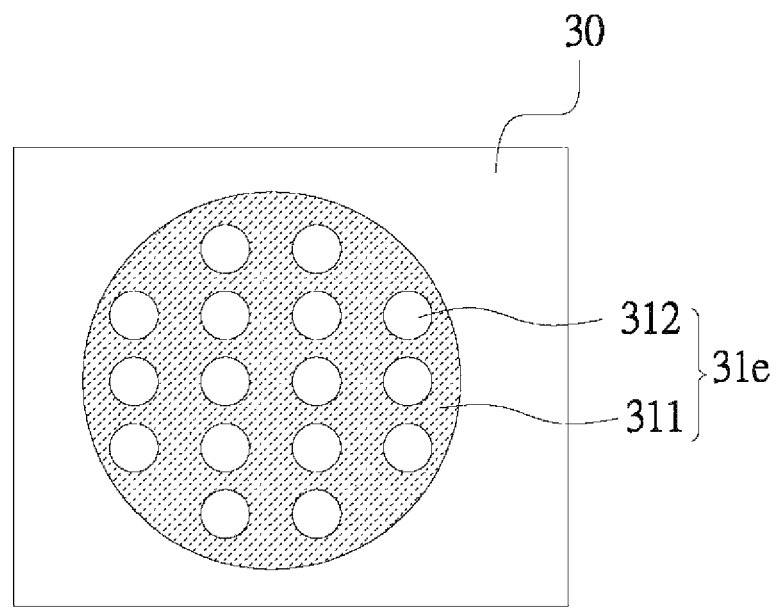
FIG. 2E is a schematic drawing showing a semitransparent structure of a touch panel according to one or more embodiments.

Now please refer to FIG. 2E, which is a schematic drawing, showing a semitransparent structure of a fifth embodiment of a touch panel according to the present invention.

In the fifth embodiment of the semitransparent structure, since the non-atomized area 312 of the semitransparent structure 31e is in a dotted shape, and the atomized area 311 is surrounded around the non-atomized area 312, the light shielding rate can be adjusted through the size and distribution density of the atomized area 311.

Through the semitransparent structures 31a to 31e described above, the light shielding rate required for the semitransparent area 30 on the touch panel 10a can be obtained, but the present invention is not limited to the aforementioned semitransparent structures 31a to 31e. The structures interlaced by the atomized area 311 and the non-atomized area 312 are all within the scope of the present invention.

Figure 3:
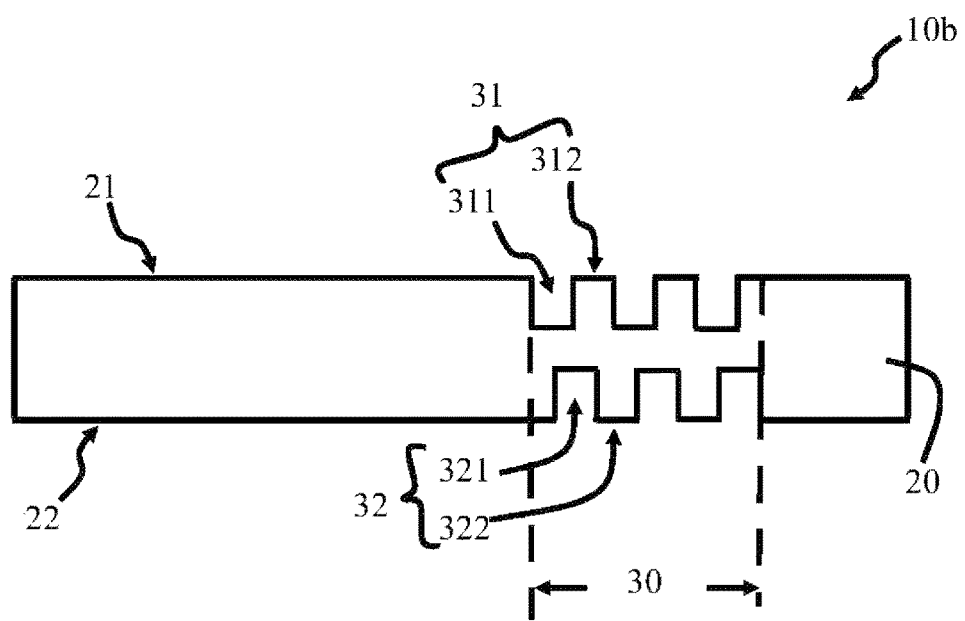
FIG. 3 is a cross-sectional view of the touch panel according to one or more embodiments.

Now please refer to FIG. 3, which is a cross-sectional view of a second embodiment of the touch panel according to the present invention.

In addition to the first embodiment shown in FIG. 1B, in the second embodiment of the present invention, the first base board 20 of the touch panel 10b can further perform the atomizing process on the second surface 22. Therefore, the second surface 22 of the first base board 20 will have a second semitransparent structure 32 which is interlaced by the atomized area 321 and the non-atomized area 322 similarly. Accordingly, the light shielding rate of the semitransparent area 30 can be changed through the touch panel 10b by adjusting the overlap area of the first semitransparent structure 31 and the second semitransparent structure 32 in a direction perpendicular to the first surface 21 of the first base board 20. The second semitransparent structure 32 may be one of the semitransparent structures 31a to 31e or another structure, but the present invention is not limited thereto.

Figure 4:
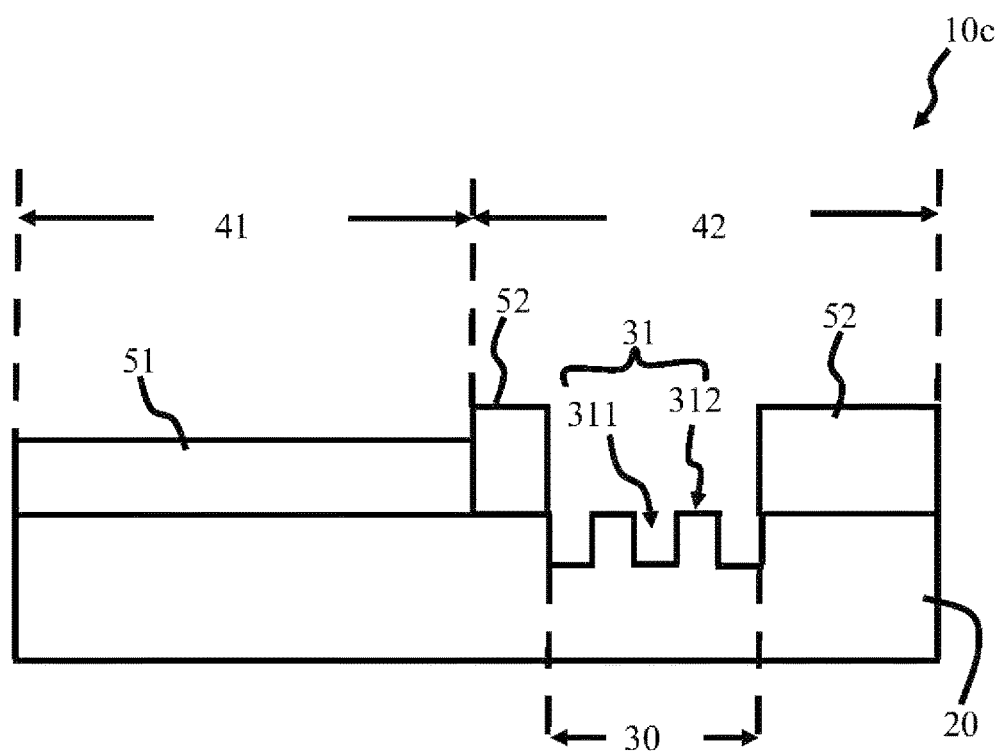
FIG. 4 is a cross-sectional view of the touch panel according to one or more embodiments.

Now please refer to FIG. 4, which is a cross-sectional view of a third embodiment of the touch panel according to the present invention.

In the third embodiment of the present invention, the touch panel 10c may further include a sensing area 41, a surrounding area 42, a sensing electrode layer 51, and a shielding layer 52. The sensing area 41 is used for touch operation, and thus the sensing electrode layer 51 may be provided within the scope of the sensing area 41. The material of the sensing electrode layer 51 may comprise indium tin oxide, indium zinc oxide, cadmium tin oxide, aluminum zinc oxide, indium zinc tin oxide, zinc oxide (ZnO), cadmium oxide, hafnium oxide, indium gallium zinc oxide, indium gallium zinc magnesium oxide, indium gallium magnesium oxide, indium gallium aluminum oxide, nano metal or graphene, etc. The sensing electrode layer 51 includes a plurality of sensing electrodes for detecting a user's touch. The sensing electrode layer 51 is disposed on the first surface 21 of the first base board 20 and at least located within the sensing area 41. The surrounding area 42 is at least disposed on one side of the sensing area 41 or surrounding the sensing area 41. The shielding layer 52 is disposed on the first surface 21 of the first base board 20 within the surrounding area 42 to shield peripheral components on the touch panel 10c. The shielding layer 52 may be made by an ink printing method or by using exposure and developing etched polyimide, but the present invention is not limited thereto. In the third embodiment, the semitransparent area 30 is disposed within the surrounding area 42, and no said shielding layer 52 is provided within the semitransparent area 30, such that light can still partially pass through the semitransparent area 30. In this configuration, the light shielding rate of the first semitransparent structure 31 can still be changed through the touch panel 10c by adjusting the size of the atomized area 311.

Figure 5:
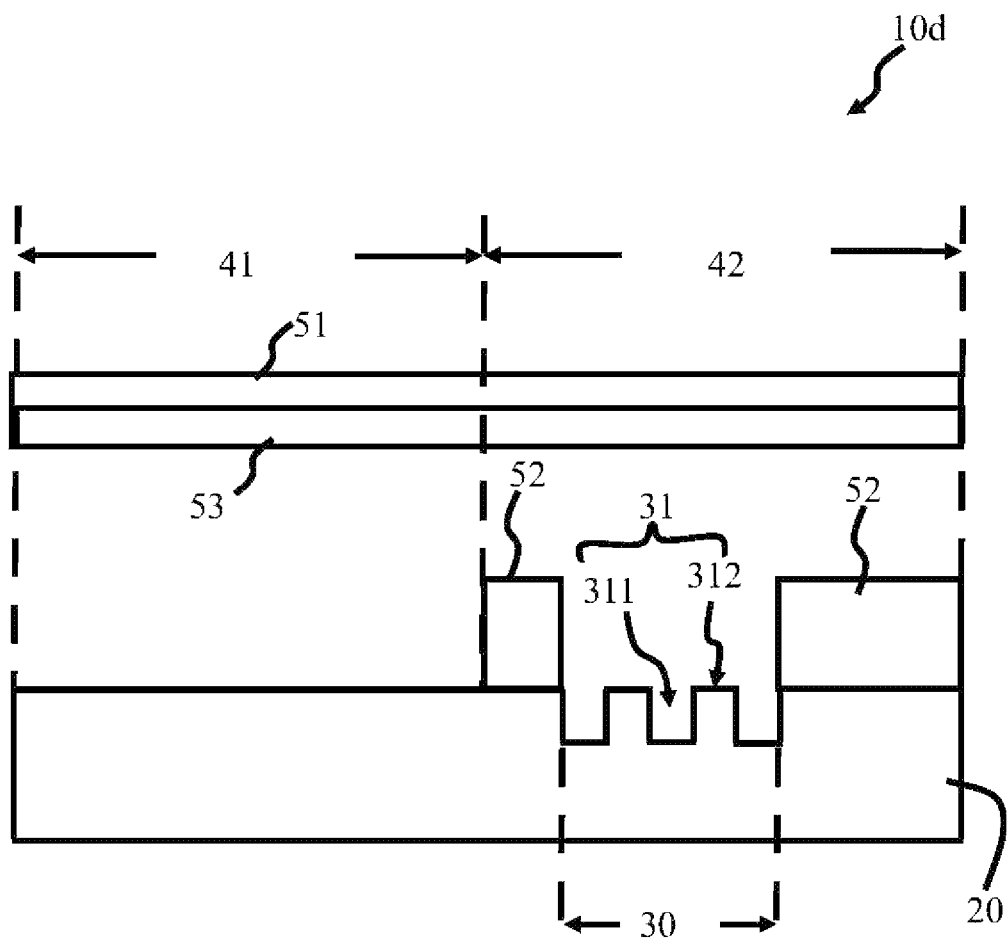
FIG. 5 is a cross-sectional view of the touch panel according one or more embodiments.

Now please refer to FIG. 5, which is a cross-sectional view of a fourth embodiment of the touch panel according to the present invention.

In the fourth embodiment of the present invention, the touch panel 10d includes a sensing area 41, a surrounding area 42, a second base board 53, a sensing electrode layer 51, and a shielding layer 52. The surrounding area 42 is disposed on one side of the sensing area 41 or surrounds the sensing area 41. The semitransparent area 30 is also within the surrounding area 42. Similarly, the shielding layer 52 is disposed on the first surface 21 of the first base board 20 and located within the scope of the surrounding area 42 without the semitransparent area 30. Unlike that in the third embodiment, the touch panel 10d further includes a second base board 53. The second base board 53 is located above the first surface 21 of the first base board 20 and used for disposing the sensing, electrode layer 51, whereby the sensing electrode layer 51 can be extended at the same time to the sensing area 41 and the surrounding area 42, but is not limited to the range of the sensing area 41. In this configuration, the effect of the semitransparent area 30 is not affected, and the light shielding rate of the first semitransparent structure 31 can be changed through the touch panel 10d by adjusting the size of the atomized area 311.

Figure 6:
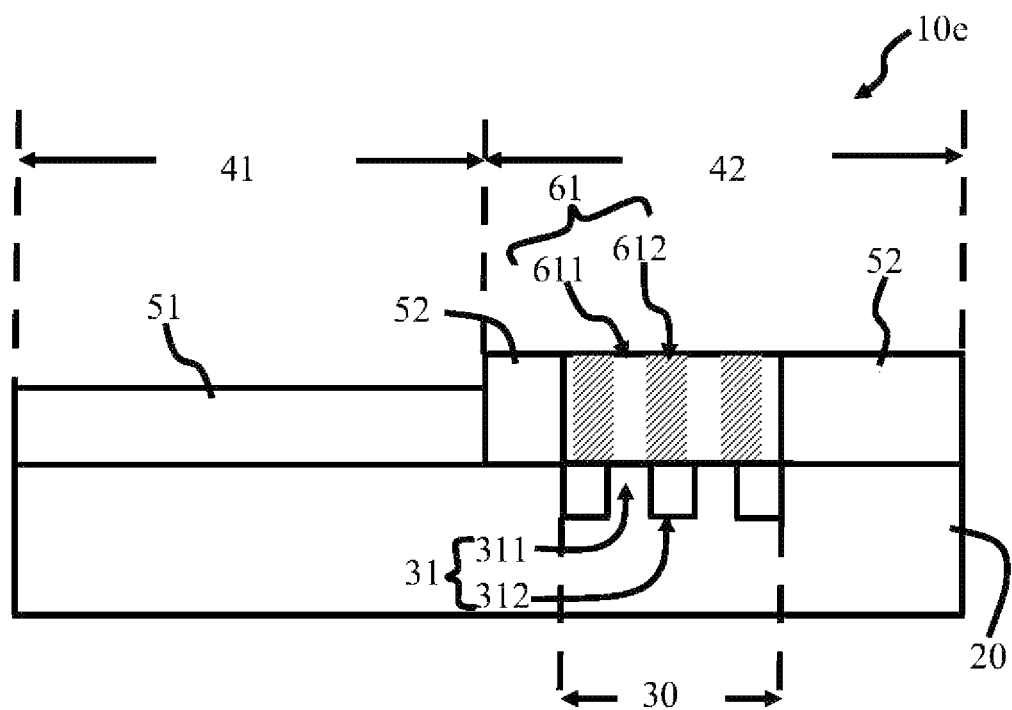
FIG. 6 is a cross-sectional view of the touch panel according to one or more embodiments.

Now please refer to FIG. 6, which is a cross-sectional view of a fifth embodiment, of the touch panel according to the present invention.

In the fifth embodiment of the present invention, the difference between the touch panel 10e and the touch panel 10d in the fifth embodiment of the present invention is that the touch panel 10e further includes a light shielding rate adjusting section 61. The light shielding rate adjusting section 61 is disposed on the first surface 21 of the first base board 20 within the semitransparent area 30, wherein the light shielding rate adjusting section 61 includes a transparent structure 611 and a non-transparent structure 612 used to change a light shielding rate of the light shielding rate adjusting section 61 by adjust the area of the transparent structure 611. The non-transparent structure 612 may be made by an ink printing method or by using exposure and developing etched polyimide, but the present invention is not limited thereto. Also, in the vertical direction of the first base board 20, the atomized area 311 of the first semitransparent structure 31 may be partially or completely located within the transparent structure 611 of the light shielding rate adjusting section 61. Thus, the overall light shielding rate of the semitransparent area 30 can be changed through the touch panel 10e by adjusting the overlap area of the atomized area 311 and the transparent structure 611 of the light shielding rate adjusting section 61 in a direction perpendicular to the first surface 21 of the first base board 20. Therefore, the touch panel 10e can flexibly adjust the light shielding rate to achieve the best semitransparent effect within a specific size of the semitransparent area.

Figure 7:
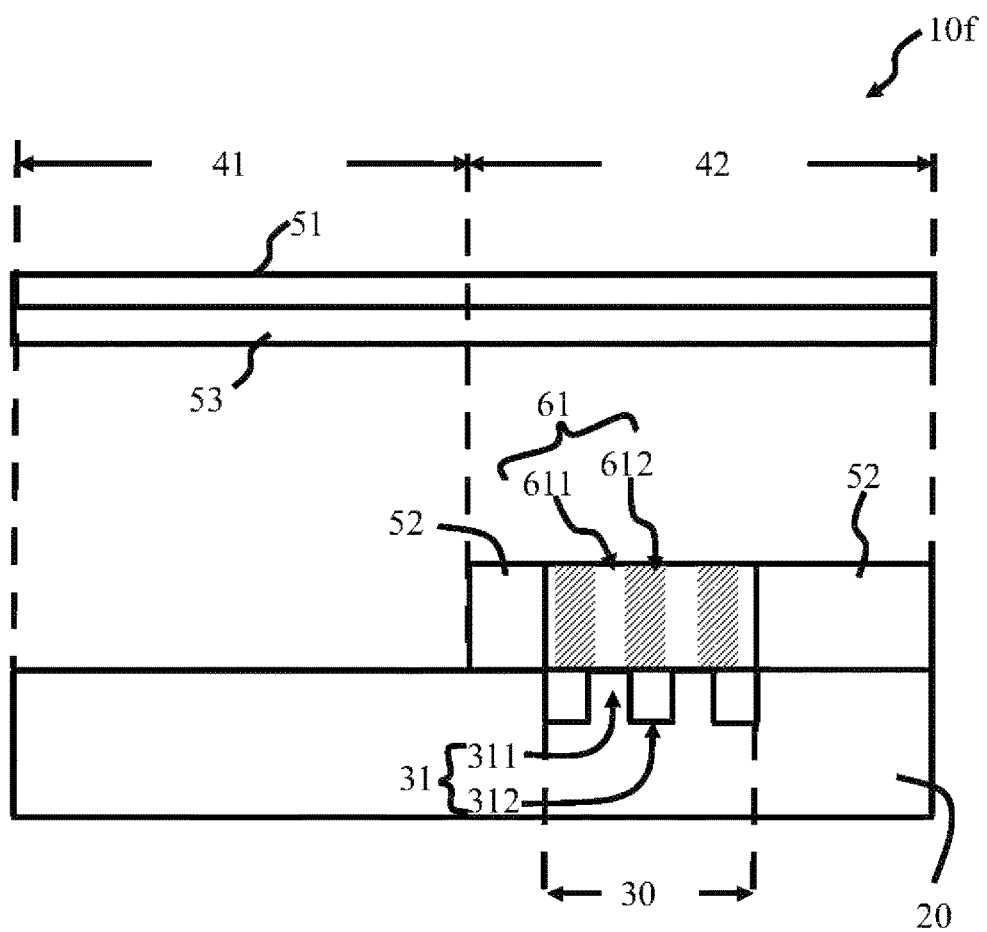
FIG. 7 is a cross-sectional view of the touch panel according to one or more embodiments.

Now please refer to FIG. 7, which is a cross-sectional view of a sixth embodiment of the touch panel according to the present invention.

In the sixth embodiment of the present invention, the difference between the touch panel 10f and the touch panel 10e in the fifth embodiment of the present invention is that the touch panel 10f further includes a second base board 53. The sensing electrode layer 51 is disposed on the second base board 53. In this configuration, the overall light shielding rate of the semitransparent area 30 and the light shielding rate adjusting section 61 can still be changed through the touch panel 10f by adjusting the overlap area of the atomized area 311 and the transparent structure of the light shielding rate adjusting section 61.

Particularly, in view of the structure of the touch panel 10d in the fourth embodiment and the touch panel 10f in the sixth embodiment of the present invention, wherein the sensing electrode layer 51 is disposed on the second base board 53, the subsequent element (e.g., liquid crystal display (LCD)) has a flat working surface, which facilitates overall assembly of the touch panel and display panel.

The aforementioned touch panels 10a to 10f can all be used in the touch control electronic device 1. As shown in FIG. 1A, there may be two semitransparent areas 30 within the surrounding area 42 of the touch control electronic device 1, but the present invention is not limited to such number. It should be noted that the sensing area 41 and the surrounding area 42 can be found on the surface of the touch control electronic device 1 as shown in FIG. 1A, and the sensing area 41 is surrounded by the surrounding area 42, but the present invention is not limited thereto. There may be only one sensing area 41 on the surface of the touch control electronic device 1, and the semitransparent area 30 may be located within the sensing area 41.

With the above-described embodiments, the touch panel 10a, 10b, 10c, 10d, 10e or 10f have the light shielding rate that is determined by the atomized area 311 formed in the atomizing process. This can effectively solve the shortcoming of only using the ink printing method to adjust the light shielding rate in other approaches.

Although the embodiments of the present invention are disclosed as above, they are not intended to limit the disclosure. Various changes and modifications may be made by those skilled in the art to the described embodiments without departing from the scope of The disclosure. Therefore, the scope of the disclosure shall be subject to what is defined by the appended claims.

What is claimed is:

1. A touch panel, comprising:
   a first base board made of transparent materials;
   a semitransparent area formed in the first base board;
   wherein the semitransparent area includes at least one first semitransparent area formed on a first surface of the first base board;
   wherein the first semitransparent area comprises:
      an atomized area; and
      a non-atomized area interlaced with the atomized area, thereby forming a rough surface of wavy structure having a plurality of opaque recesses;
      wherein sidewalls of the opaque recesses are formed by the non-atomized area; and
      wherein the non-atomized area is derived from a part of the first base board;
   wherein a light shielding rate of the first semitransparent area is proportional to a ratio of size of the atomized area to size of the non-atomized area.

2. The touch panel as claimed in claim 1, wherein the atomized area is formed by a laser treatment, an acid etching treatment, a blast treatment, or a surface grinding treatment.

3. The touch panel as claimed in claim 1, wherein the atomized area is a successive non-transparent structure, and the non-atomized area is a successive transparent structure.

4. The touch panel as claimed in claim 3, wherein the atomized area and the non-atomized area are interlaced with each other to form a spiral pattern on the first surface of the first base board.

5. The touch panel as claimed in claim 1, wherein the atomized area is a non-successive non-transparent structure, and the non-atomized area is a non-successive transparent structure.

6. The touch panel as claimed in claim 1, wherein the atomized area and the non-atomized area are interlaced with each other to form a plurality of concentric circles pattern on the first surface of the first base board.

7. The touch panel as claimed in claim 1, further comprising:
   a sensing area;
   a surrounding area, which is at least disposed on one side of the sensing area, wherein the first semitransparent area is located within the surrounding area;
   a sensing electrode layer, which is disposed on the first surface of the first base board and located at least within the sensing area; and
   a shielding layer, which is disposed on the first surface of the first base board within the surrounding area, wherein no said shielding layer is provided within the first semitransparent area.

8. The touch panel as claimed in claim 7, further comprising a light shielding rate adjusting section disposed on the first surface of the first base board and located within the first semitransparent area, wherein the light shielding rate adjusting section comprises a transparent structure and a non-transparent structure; wherein in a vertical direction of the first base board, the atomized area of the first semitransparent structure is partially or completely located within the transparent structure of the light shielding rate adjusting section.

9. The touch panel as claimed in claim 1, further comprising:
   a sensing area;
   a surrounding area, which is at least disposed on one side of the sensing area, wherein the first semitransparent area is located within the surrounding area;
   a second base board, which is disposed on the first surface of the first base board;
   a sensing electrode layer, which is disposed on the second base board and at least located within the sensing area; and
   a shielding layer, which is disposed on a first surface of the first base board within the surrounding area, wherein no said shielding layer is provided within the first semitransparent area.

10. The touch panel as claimed in claim 9, further comprising a light shielding rate adjusting section disposed on the first surface of the first base board and located within the first semitransparent area, wherein the light shielding rate adjusting section comprises a transparent structure and a non-transparent structure; wherein in a vertical direction of the first base board, the atomized area of the first semitransparent structure is partially or completely located within the transparent structure of the light shielding rate adjusting section.

11. The touch panel as claimed in claim 1, wherein the semitransparent area further comprises at least one second semitransparent area;
   wherein the second semitransparent area are formed on a second surface of the first base board in opposite to the first surface;
   wherein the second semitransparent area comprises:
      an atomized area;
      a non-atomized area interlaced with the atomized area, thereby forming a rough surface of wavy structure having a plurality of opaque recesses;
         wherein sidewalls of the opaque recesses are formed by the non-atomized area; and
         wherein the non-atomized area is derived from a part of the first base board;
   wherein a light shielding rate of the second semitransparent area is proportional to a ratio of size of the atomized area to size of the non-atomized area.

* * * * *